US011789422B2

(12) United States Patent
Schäuble et al.

(10) Patent No.: US 11,789,422 B2
(45) Date of Patent: Oct. 17, 2023

(54) AUTOMATION FIELD DEVICE

(71) Applicant: Endress+Hauser SE+Co. KG, Maulburg (DE)

(72) Inventors: Harald Schäuble, Lörrach (DE); Simon Gerwig, Schopfheim (DE); Christian Strittmatter, Rickenbach (DE); Wolfgang Brutschin, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 481 days.

(21) Appl. No.: 17/269,140

(22) PCT Filed: Jul. 30, 2019

(86) PCT No.: PCT/EP2019/070465
§ 371 (c)(1),
(2) Date: Feb. 17, 2021

(87) PCT Pub. No.: WO2020/035301
PCT Pub. Date: Feb. 20, 2020

(65) Prior Publication Data
US 2021/0311450 A1    Oct. 7, 2021

(30) Foreign Application Priority Data
Aug. 17, 2018   (DE) ..................... 10 2018 120 108.7

(51) Int. Cl.
  *G05B 19/042*   (2006.01)
  *G08C 19/00*   (2006.01)
  *H04Q 9/00*   (2006.01)
(52) U.S. Cl.
  CPC ......... *G05B 19/0428* (2013.01); *G08C 19/00* (2013.01); *H04Q 9/00* (2013.01);
  (Continued)

(58) Field of Classification Search
  CPC ...... G05B 19/0428; G05B 2219/25428; G05B 2219/33192; G05B 2219/34313; G08C 19/00; H04Q 9/00
  See application file for complete search history.

(56) References Cited

U.S. PATENT DOCUMENTS 5,636,208 A * 6/1997 Chang ..................... H04L 7/043
                                                         370/347
10,502,610 B2 * 12/2019 Fehrenbach ............ G01F 23/28
(Continued)

FOREIGN PATENT DOCUMENTS

DE    102016122714 A1    5/2018

*Primary Examiner* — Ramesh B Patel
(74) *Attorney, Agent, or Firm* — Mark A. Logan; Endress+Hauser (USA) Holding, Inc.

(57) ABSTRACT

Disclosed is a field device comprising: a connection terminal; field device electronics; an internal interface for connecting an electronic module; the electronic module having at least one electronic component for realizing an additional functionality; a capacitor, which is designed to provide an additional first auxiliary energy amount to the component if the component of the electronic module has an energy demand exceeding the main power; a battery, which is designed to provide a second auxiliary energy amount to the at least one component if the at least one component of the electronic module has an energy demand exceeding the main power and the first auxiliary energy amount, wherein the battery provides the second auxiliary energy amount to the component only if the main power and the first auxiliary energy amount are not sufficient for the energy supply of the component.

13 Claims, 1 Drawing Sheet

(52) U.S. Cl.
CPC ............. *G05B 2219/25428* (2013.01); *G05B 2219/33192* (2013.01)

(56) References Cited

U.S. PATENT DOCUMENTS

| | | | |
|---|---|---|---|
| 10,556,510 B2* | 2/2020 | Yazami | H01M 10/486 |
| 11,588,511 B2* | 2/2023 | Schäuble | G05B 19/4155 |
| 2007/0285224 A1* | 12/2007 | Karschnia | G05B 19/4185 |
| | | | 340/539.1 |
| 2012/0326525 A1* | 12/2012 | Sinreich | G05B 19/0423 |
| | | | 307/104 |
| 2013/0082667 A1* | 4/2013 | Sinreich | H02J 1/06 |
| | | | 323/234 |
| 2016/0146895 A1* | 5/2016 | Yazami | H01M 10/486 |
| | | | 324/426 |
| 2017/0167911 A1* | 6/2017 | Fehrenbach | G01S 13/08 |
| 2017/0272591 A1* | 9/2017 | Odaira | H04N 1/00477 |

* cited by examiner

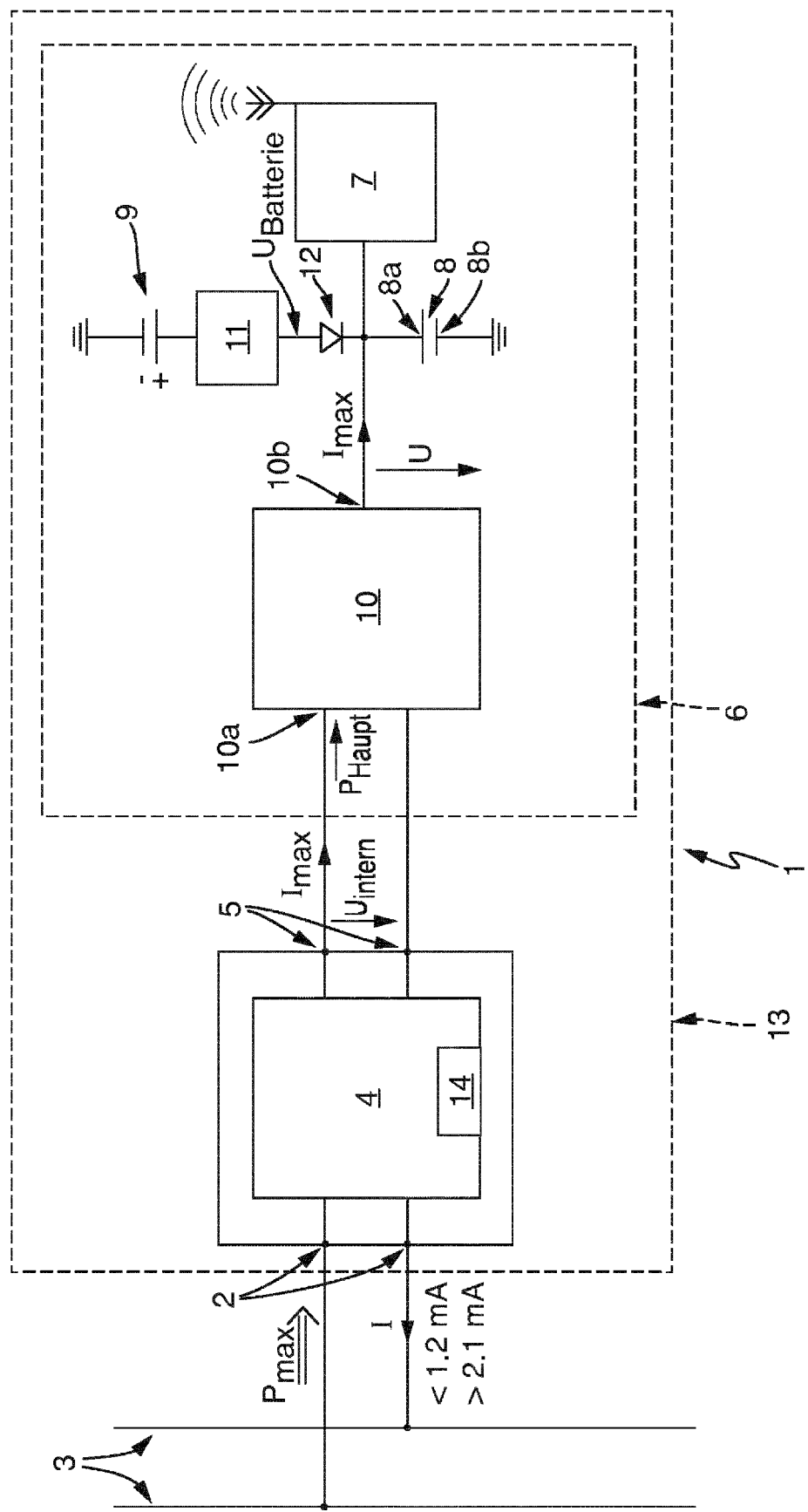

AUTOMATION FIELD DEVICE

CROSS-REFERENCE TO RELATED APPLICATIONS

The present application is related to and claims the priority benefit of German Patent Application No. 10 2018 120 108.7, filed on Aug. 17, 2018 and International Patent Application No. PCT/EP2019/070465, filed on Jul. 30, 2019, the entire contents of which are incorporated herein by reference.

TECHNICAL FIELD

The invention relates to a field device, in particular a Namur automated field device.

BACKGROUND

Field devices serving to capture and/or modify process variables are frequently used in process automation technology. Sensors, such as fill level measuring devices, flow meters, pressure and temperature measuring devices, pH-redox potential meters, conductivity meters, etc., are used for recording the respective process variables, such as fill level, flow, pressure, temperature, pH level, and conductivity. Field devices, in general, refer to all devices which are process-oriented and which supply or process process-relevant information. A variety of such field devices are manufactured and marketed by the Endress+Hauser company.

In addition to the aforementioned field devices however, so-called Namur field devices or switchgears which can be designed as point level switches, for example, are also included in the list of field devices. Such field devices designed as point level switches can for example have vibronic sensors with at least one unit that can mechanically vibrate, or capacitive and/or conductive sensors. The basic principles and different embodiments are disclosed in a plurality of publications. A great variety of corresponding field devices are produced by the applicant and are marketed under the name of LIQUIPHANT and/or SOLIPHANT for example in the case of vibronic point level switches, and under the name of LIQUIPOINT fore example in the case of capacitive and/or conductive point level switches.

In the case of a vibronic point level switch for liquids, a distinction is made as to whether the oscillatable unit is covered by liquid or vibrates freely. These two states, the free state and the covered state, are differentiated in terms of different residence frequencies, i.e., a frequency shift. The density and/or viscosity in turn can be determined with such a measurement device only given an at least partial coverage with the medium.

However, in the case of a conductive point level switch, it is recognized whether electrical contact exists via a conductive medium between a probe electrode and the wall of a conductive container or a second electrode. In a capacitive measuring method, the fill level is contrastingly determined from the capacitance of the capacitor formed by a probe electrode and the wall of the container or a second electrode. Depending on the conductivity of the medium, either the medium itself or probe insulation forms the dielectric of the capacitor.

The so-called Namur field devices or switchgears were first defined in the NAMUR (Association for Standardization of Measurement and Control Engineering in the Chemical Industry) worksheet NA 001, which was carried over to the standard DIN EN 60947-5-6 (issue date: December 2000). In this case, field devices or switchgears only transmit binary information in the form of a specific current signal. For example, Namur field devices indicate whether a specific limit level is reached.

According to the standard DIN EN 60947-5-6, provision is made for the field device to be operated with a load-independent current, so that it is supplied with energy directly from a current loop. This is possible since the field device during operation has a maximum power requirement that is less than a value of the specific current signal. This is then also referred to as so-called two-wire field devices, since only one two-wire line, i.e. a line with two cores, is required for connecting the devices. The binary information (e.g., limit level is reached or not reached) is always communicated via a corresponding specific current value from the field device to an (analog) evaluation unit, for example a PLC (programmable logic controller). According to the standard referred to above, a current value of less than 1.2 mA and a current value greater than 2.1 mA are provided as specific current values. In the case of a point level switch, this means that a specific current value of less than 1.2 mA signals that the corresponding limit level is reached, and a specific current value greater than 2.1 mA signals that the limit level is not yet reached.

Due to the fact that only a limited amount of power is available to the field device, the design and the construction of the field device are subject to the most stringent requirements. This applies in particular in the event that, in addition to the pure internal evaluation unit, which serves for example to determine the limit level, the field device is also intended to have further functions which are realized by corresponding electronic components.

In this case, a radio functionality of the field device can constitute such a function, by means of which, for example, the limit level can additionally be communicated via a corresponding radio signal. Radio systems in this case occasionally require much more energy than the field device can provide via the two-wire line, for example in a corresponding radio interval in which the measurement or limit value is communicated. However, not only in the case of the transmission of the measurement or limit value, but also, for example, in the case of a software update which is performed "over the air", much more energy is required short term than the field device can provide via the two-wire line.

The aim of the invention is thus to provide an automated field device, in particular a Namur field device having an additional functionality, in particular a radio functionality.

SUMMARY

The object is accomplished according to the invention by means of the field device, in particular the Namur automated field device according to claim 1.

The automated field device according to the invention, in particular Namur field device, comprises:
- a connecting terminal for connecting a two-wire line;
- field device electronics which are provided with maximum operating power via the connecting terminal through the two-wire line, wherein the field device electronics are configured to perform a main functionality of the field device, in particular a measurement or limit value detection; and
- an internal interface provided by the field device electronics for connecting an electronics module;
- the electronics module having at least one electronic component for realizing an additional functionality, wherein the at least one electronic component of the electronics module is connected to the field device electronics for data transmission via the internal interface, and the internal interface of the at least one electronic component also provides main power, a capacitor associated with the electronics module and configured such that the capacitor is charged via the internal interface and, in the event that the at least one component of the electronics module has an energy demand exceeding the main power, the at least one component provides additional first auxiliary energy;

a battery associated with the electronics module, designed such that the battery, in the event that the at least one component of the electronics module has an energy demand exceeding the main power and the first auxiliary energy, provides second auxiliary energy to the at least one component, wherein the capacitor and the battery are coordinated such that the battery provides the at least one component with the second auxiliary energy only if the main power and the first auxiliary energy are not sufficient for the energy supply of the at least one component.

In this case, a Namur field device is to be understood as a field device which is designed according to the standard DIN EN 60947-5-6 (issue date: December 2000), and thus binary information is communicated via the two-wire line on the basis of two different specific current values, wherein first information of the binary information, in particular the information that the limit level is reached, is communicated via a first specific current value of less than 1.2 mA, and second information of the binary information, in particular the information that the limit level has not yet been reached, is communicated via a second specific current value greater than 2.1 mA.

An advantageous embodiment of the field device provides that the at least one component comprises a radio module which is set up to communicate data wirelessly, and wherein the at least second auxiliary energy preferably supplies the radio module with energy only in the event of a transmit or receive process.

A further advantageous embodiment of the field device further provides that a current limiting circuit which is connected at an input to the internal interface and at an output to the at least one component of the electronics module, is designed to limit a current, which flows via the internal interface, to a specific current value. In particular, the embodiment can provide that the capacitor and the battery are arranged between the output of the current limiting circuit and the at least one component, and are coordinated with one another such that the battery of the at least one component provides the second auxiliary energy only when an output voltage at the output of the current limiting circuit drops below a specific value, preferably a specific value of less than 3 V, particularly preferably less than 2.75 V, particularly preferably less than 2.5 V. Additionally or alternatively, the embodiment may provide that a regulator is provided in a connection between the battery and the output of the current limiting circuit which regulates a battery voltage to a value which is less than the specific value at the output of the current limiting circuit and/or that a blocking element, in particular in the form of a diode or as an integral component of the regulator, is also provided in the connection between the battery and the output of the current limiting circuit, wherein the blocking element is designed to prevent a current flow from the output of the current limiting circuit to the battery.

A further advantageous embodiment of the field device provides that the capacitor has a plurality of ceramic capacitors, and the capacitor preferably has a size in the range of 500 μF to 2 mF.

A further advantageous embodiment of the field device provides that the battery and the capacitor are connected to one another in parallel at the output of the current limiting circuit.

A further advantageous embodiment of the field device provides that the battery is designed in accordance with the standard IEC 60086-4, issue date Sep. 3, 2014 and/or the standard IEC 60079-11, issue date Jun. 30, 2011, so that the battery is designed for use in an explosive area. A further advantageous embodiment of the field device provides that the internal interface for data transmission is designed as a UART interface.

A further advantageous embodiment of the field device provides that the radio module is set up for wireless data transmission in accordance with one of the following standards, or protocols, or a modified variant thereof:

Bluetooth or Bluetooth Low Energy;
6 LoWPAN;
6TiSCH; or
Wireless HART.

A further advantageous embodiment of the field device further provides a field device housing in which the field device electronics and the electronics module are arranged.

An alternative embodiment of the field device further provides a field device housing in which the field device electronics are arranged, wherein the electronics module is arranged outside on the field device housing.

BRIEF DESCRIPTION OF THE DRAWINGS

The invention is explained in more detail based upon the following drawing. The following is shown:

FIG. 1 shows an embodiment of an automated field device according to the present disclosure.

DETAILED DESCRIPTION

FIG. 1 shows an embodiment of an automated field device 1 according to the invention. The field device 1 shown in FIG. 1 is a Namur field device which, for example, is designed as a limit level switch in accordance with the standard DIN en 60947-5-6 (issue date: December 2000). Namur field devices 1 of this type are supplied with energy by means of a load-independent loop current I via a two-wire line 3 so that, in addition to transmitting measured values, the two-wire line 3 also supplies power to the field device 1, i.e., no separate or additional power supply unit is provided for supplying energy.

In order to perform a main functionality, for example the detection of a specific limit level and transmission of the limit level in the form of a measured value, the field device has field device electronics 4 located inside a field device housing 13. For this purpose, the field device electronics 4 can have a sensor unit 14 which is used for detecting a process variable, in particular for detecting the limit level.

The sensor unit 14 can detect the process variable at a measurement rate $f_M$ and provide a process variable signal dependent thereupon, which signal is converted by the field device electronics to an output signal that can be output.

The generated process variable signal only knows two states which are transmitted by the two-wire line 3; on the one hand, the state that the limit level is reached, and on the other hand, the state that the limit level is (still) not reached.

Correspondingly, the field device electronics 4 are set up to output a current value of greater than 2.1 mA as an output signal via the two-wire line 3 if the measured values detected by the sensor unit indicate that the limit level is not yet reached, and to output a current value of less than 1.2 mA as an output signal via the two-wire line if the detected measured values indicate that the limit level is reached.

In order for the field device electronics 4 to be able to communicate the output signal via the two-wire line 3, a connecting terminal 2 is available for connecting the two-wire line 3. Furthermore, the field device electronics 4 are provided via the two-wire line 3 connected to the connecting terminal 2 with a maximum operating power Pmax used to supply energy to all components, in particular the sensor unit 14, which are needed for performing the main functionality, in particular detecting the limit level and communicating a corresponding current value.

Furthermore, the field device electronics 4 have an internal interface 5 which is designed such that an electronics module 7 can be connected for realizing or performing an additional functionality. In this case, the internal interface 5 can be configured as a UART interface (Universal Asynchronous Receiver Transmitter) with regard to the data transmission between the electronics module 7 and the field device electronics 4. In addition to the data transmission, the internal interface 5 is further designed to provide the electronics module 7 with a main power Phaupt. In this case, the field device electronics 4 are designed to provide an internal voltage Uintern and an internal current Imax, which serve to supply the electronics module 7, at the internal interface. The field device electronics 4 are preferably designed such that a maximum internal voltage Uintern of approximately 3 V is available at the internal interface 5.

To realize a radio functionality as an additional functionality, the field device 1 has an electronics module 6 with a radio unit 7 arranged within the field device housing 13. In this case, the radio unit 7 can be set up for wireless data transmission in accordance with one of the following standards or protocols or a modified variant thereof:

Bluetooth or Bluetooth Low Energy;
6 LoWPAN;
6TiSCH; or
Wireless HART.

In order to be able to provide sufficient energy to a transmit or receive process of the radio unit, the electronics module 6 further has a capacitor 8 which provides the radio unit 7 with a first auxiliary energy Ehilf1. The capacitor 8 may, for example, have a value in the range of 800 µF to 1.6 mF. Furthermore, the capacitor 8 is preferably in the form of a capacitor. The capacitor is connected in such a way that it is charged by the field device electronics 4 via the internal interface 5 and, in the event that the radio unit 7 has an energy demand exceeding the main power Phaupt during the transmit or receive process, additionally provides the radio unit 7 with the first auxiliary energy Philf1. For example, the capacitor may be connected to the radio unit 7 by a first electrode 8a and to ground by a second electrode 8b. It goes without saying that the capacitor 8 can also be formed by a plurality of capacitors which are connected accordingly. In order to minimize the space required for the capacitor 8 on the electronics module 6, the capacitor 8 is preferably formed from a plurality of ceramic capacitors, each of which has a single capacitance of 100 µF and is connected in such a way that a capacitance value in the range from 500 µF to 2 mF, preferably in the range from 800 µF to 1.6 mF, results.

The electronics module 6 furthermore has a current limiting circuit 10 which is set up to limit the current flow via the internal interface 5 to a maximum current value Imax, for example approximately 0.8 mA. By limiting the current, a maximum main power provided by the field device electronics via the internal interface is limited to a maximum value, for example approx. 2.4 mW (=Uintern*Imax=3 V*0.8 mA). The current limiting circuit 10 is also electrically connected in such a way that an input 10a is connected to the internal interface 5, and an output of the current limiting circuit 10b is connected to the first electrode 8a and the radio unit 7 so that a voltage U with a predetermined value, for example a value of less than 3 V, preferably a value from the range 2.5 to less than 3 V, is present at the output of the current limiting circuit 10b.

Also provided according to the invention is a battery 9 which is associated with the electronics module 6 and is preferably part of the electronics module 6. In this case, the battery 9 is designed such that, in the event that the radio module 7 briefly, for example during a transmit or receive process, has an energy demand exceeding the main power Phaupt and the first auxiliary energy Ehilf1, it provides the radio module 7 with a second auxiliary energy Ehilf2. In this case, the electronics module 6 is designed such that the battery 9 provides the radio module 7 with the second auxiliary energy Philf2 only when the main power Phaupt and the first auxiliary energy Ehilf1 are not sufficient for supplying energy to the at least one component 7. This can be realized, for example, by the battery 9 being continuously connected to the output of the current limiting circuit 10b by a regulator 11 which regulates a battery voltage Ubatterie to a value smaller than the voltage at the output of the current limiting circuit 10b, so that the battery 9 provides the second auxiliary energy Ehilf2 only when the voltage U at the output of the current limiting circuit 10b drops due to an increased energy demand by the radio module. Due to the fact that the voltage for the radio module is set to a higher value than the battery voltage downstream of the regulator Ubatterie, the battery automatically supports the energy supply of the radio module when the output voltage U drops.

In order to prevent an undesired current flow in the direction of the battery 9, it can furthermore be provided that a blocking element 12, for example a diode, is inserted between the regulator 11 and the output of the current limiting circuit 10b. Alternatively, the blocking element 12 can also be designed as an integral component of the regulator 11.

The wiring of the radio module according to the invention makes it possible to intercept energy peaks from a momentarily or temporarily increased energy demand. In this case, the auxiliary energy of the battery Ehilf 2 is used only when more energy is required internally than by the two-wire line or than is available or can be provided to the capacitor so that there is not a permanent drain on the battery.

The invention claimed is:

1. An automated Namur field device, comprising:
a connecting terminal for connecting a two-wire line;
field device electronics which are provided with maximum operating power via the connecting terminal through the two-wire line, wherein the field device electronics are configured to perform a main functionality of the field device, including a measurement or limit value detection;
an internal interface provided by the field device electronics for connecting an electronics module;
an electronics module having at least one electronic component for realizing an additional functionality, wherein the at least one electronic component of the electronics module is connected to the field device electronics for data transmission via the internal interface, and the internal interface of the at least one electronic component also provides a main power;

a capacitor associated with the electronics module and configured such that the capacitor is charged via the internal interface and, in the event that the at least one component of the electronics module has an energy demand exceeding the main power, the at least one component provides additional first auxiliary energy; and a battery associated with the electronics module, designed such that the battery, in the event that the at least one component of the electronics module requires an energy demand exceeding the main power and the first auxiliary energy, provides second auxiliary energy to the at least one component, wherein the capacitor and the battery are coordinated such that the battery provides the at least one component with the second auxiliary energy only if the main power and the first auxiliary energy are not sufficient for the energy supply of the at least one component.

2. The automated field device according to claim 1, wherein the at least one component includes a radio module which is set up to communicate data wirelessly, and wherein the at least second auxiliary energy supplies the radio module with energy only in the event of a transmit or receive process.

3. The automated field device according to claim 1, further comprising:
a current limiting circuit which is connected at an input to the internal interface and at an output to the at least one component of the electronics module, and is designed to limit a current which flows via the internal interface to a specific current value.

4. The automated field device according to claim 3, wherein the capacitor and the battery are arranged between the output of the current limiting circuit and the at least one component and are coordinated with one another such that the battery of the at least one component provides the second auxiliary energy only when an output voltage at the output of the current limiting circuit drops below a specific value.

5. The automated field device according to claim 4, further comprising:
a regulator in a connection between the battery and the output of the current limiting circuit which regulates a battery voltage to a value which is less than a specific value at the output of the current limiting circuit.

6. The automated field device according to claim 5, further comprising:
a blocking element in the form of a diode or as an integral component of the regulator in the connection between the battery and the output of the current limiting circuit which is designed to prevent a current flow from the output of the current limiting circuit to the battery.

7. The automated field device according to claim 1, wherein the capacitor comprises a plurality of ceramic capacitors, and the capacitor has a size in the range of 500 µF to 2 mF.

8. The automated field device according to claim 3, wherein the battery and the capacitor are connected to one another in parallel at the output of the current limiting circuit.

9. The automated field device according to claim 1, wherein the battery is designed in accordance with the standard IEC 60086-4, issue date Sep. 3, 2014 and/or the standard IEC 60079-11, issue date Jun. 30, 2011, such that the battery is designed for use in an explosive area.

10. The automated field device according to claim 1, wherein the internal interface for data transmission is designed as a UART interface.

11. The automated field device according to claim 2, wherein the radio module can be set up for wireless data transmission in accordance with one of the following standards or protocols or a modified variant thereof:
Bluetooth or Bluetooth Low Energy;
6 LoWPAN;
6TiSCH; and
Wireless HART.

12. The automated field device according to claim 1, further comprising:
a field device housing in which the field device electronics and the electronics module are arranged.

13. The automated field device according to claim 1, further comprising:
a field device housing in which the field device electronics are arranged, wherein the electronics module is arranged outside on the field device housing.

* * * * *